United States Patent [19]

Tolliver

[11] 4,270,776
[45] Jun. 2, 1981

[54] FLEXIBLE PIPE JOINT FOR NON-INTERENGAGING PIPE SECTIONS

[76] Inventor: Wilbur E. Tolliver, 364 Hamilton Dr., Holland, Mich. 49423

[21] Appl. No.: 39,846

[22] Filed: May 17, 1979

[51] Int. Cl.³ .............................................. F16L 21/00
[52] U.S. Cl. .................................. 285/235; 285/226; 285/423
[58] Field of Search ............... 285/223, 226, 229, 235, 285/236, 332, 332.1, 49, 364, 166, 168, 423

[56] References Cited

U.S. PATENT DOCUMENTS

| 2,154,077 | 4/1939 | Sampson | 285/223 X |
| 3,792,878 | 2/1974 | Freeman | 285/223 X |
| 3,938,834 | 2/1976 | Oostenbrink | 285/235 |
| 3,993,332 | 11/1976 | Borodin et al. | 285/369 X |

FOREIGN PATENT DOCUMENTS

| 935826 | 12/1965 | Fed. Rep. of Germany | 285/229 |
| 1500702 | 9/1969 | Fed. Rep. of Germany | 285/236 |
| 998412 | 9/1951 | France | 285/236 |
| 550236 | 2/1943 | United Kingdom | 285/236 |
| 880847 | 10/1961 | United Kingdom | 285/235 |
| 1036459 | 7/1966 | United Kingdom | 285/226 |

*Primary Examiner*—Dave W. Arola
*Attorney, Agent, or Firm*—Price, Heneveld, Huizenga & Cooper

[57] ABSTRACT

The specification discloses flexible plastic collars for joining non-interengaging pipe sections and allowing movement therebetween. The collar includes a narrow flexible mid-section with inwardly biased cylindrical skirts that taper outward from relatively thick and relatively rigid shoulders on either side of the flexible center portion. The shoulders have an annularly shaped channel on the inside surface thereof, with O-rings positioned therein which form a seal between the collar and the pipe ends.

5 Claims, 7 Drawing Figures

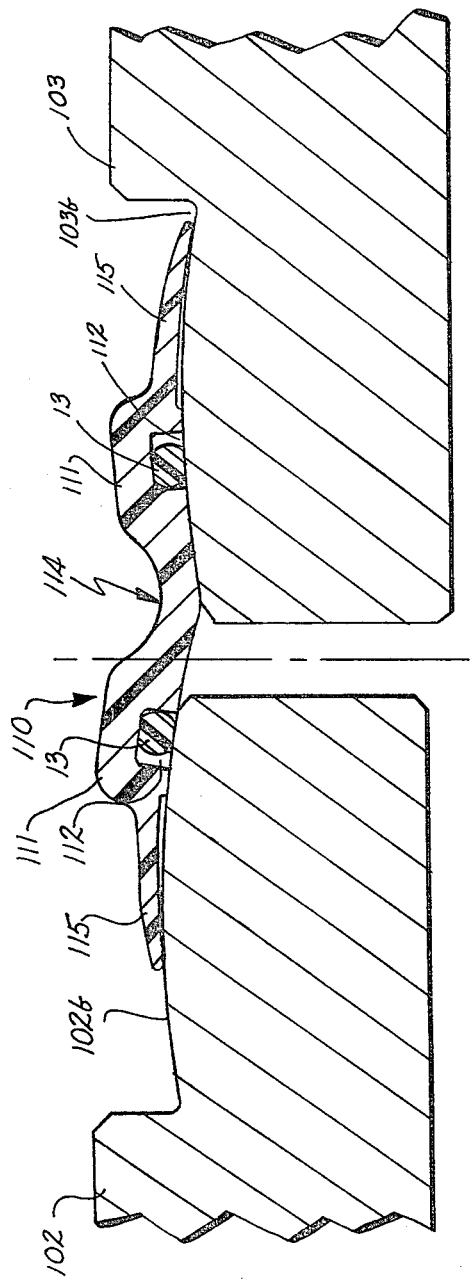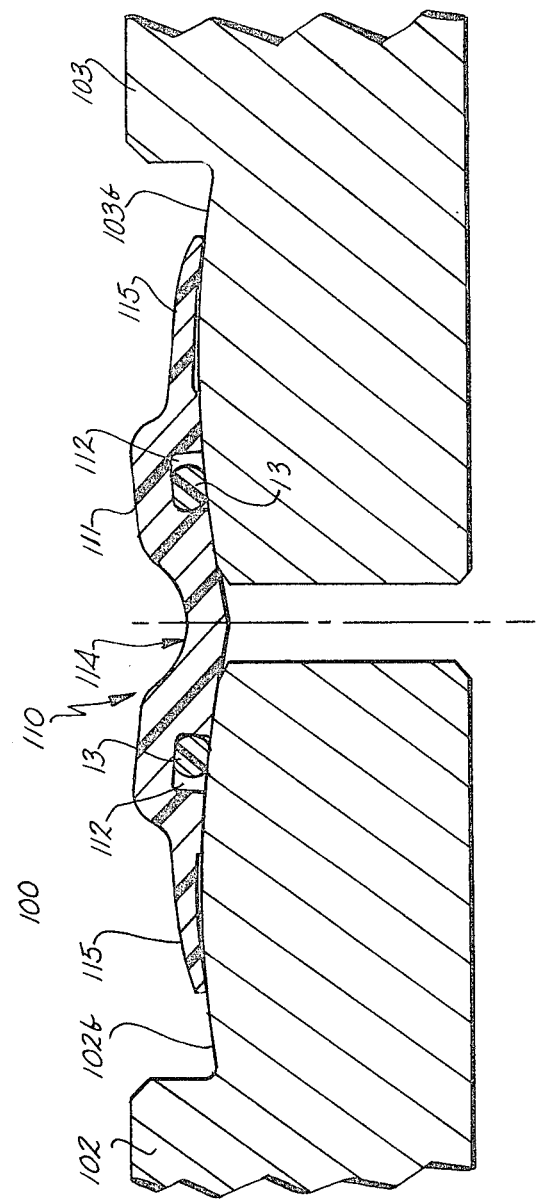

FLEXIBLE PIPE JOINT FOR NON-INTERENGAGING PIPE SECTIONS

BACKGROUND OF THE INVENTION

The present invention relates to pipe couplings, particularly pipe such as underground water and sewer pipe. In joining pipe sections so that a pipe joint formed thereby will permit some degree of misalignment or displacement between the sections, various flexible sealing means have been disclosed in prior patents. These means may generally be characterized as either resilient sleeves which surround a pipe joint formed by interconnecting pipe sections or a resilient gasket contained within such a pipe joint.

These flexible pipe sealing means are in addition to the primary coupling between the pipe sections. They are an expense in addition to the cost of providing coupling means for the pipe. It is theorized that this is the reason for their apparent lack of use on a commercial basis.

OBJECTS AND SUMMARY OF THE INVENTION

The present invention comprises a collar which is both the primary coupling for joining adjacent pipe sections and a sealing means which minimizes leakage in the event of pipe misalignment. It also allows some purposeful misalignment where that might be desired.

The collar includes a relatively flexible midsection disposed between the pipe ends, and a pair of relatively rigid shoulders on either side thereof. The shoulders include an interior channel with a seal therein which abuts the exterior surface of the adjacent pipe end. Pipe-engaging skirts extend outwardly from the shoulders and bias radially inwardly to frictionally abut against the outer surface of the respective pipe section end.

BRIEF DESCRIPTION OF THE DRAWINGS

FIG. 6 is a longitudinal cross section view of a pipe joint formed by a collar with an inwardly biased narrow mid-section and inwardly biased cylindrical skirts and two non-interengaging pipe sections; and FIG. 7 is the pipe joint of FIG. 6 with the pipe sections displaced and misaligned.

DESCRIPTION OF THE PREFERRED EMBODIMENT

Figure 1:
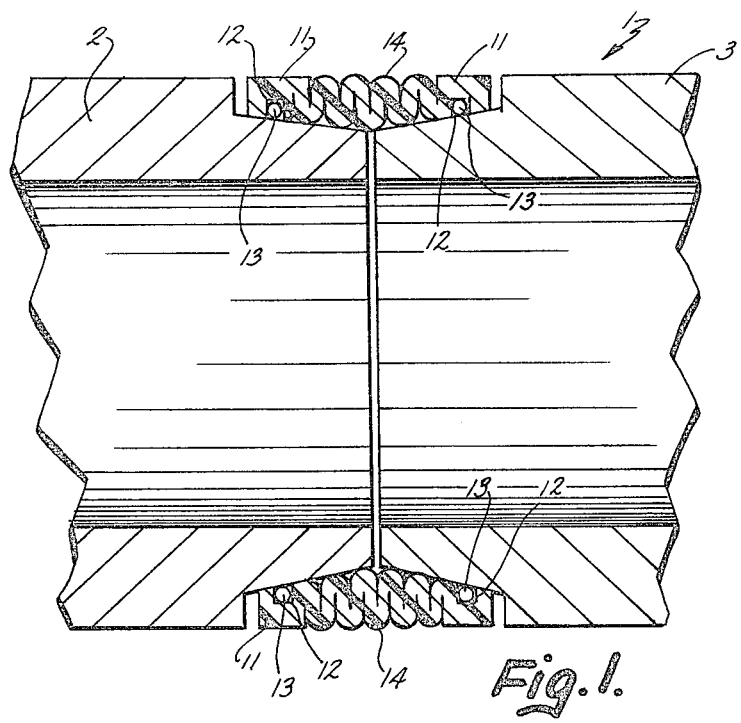
FIG. 1 is a longitudinal cross section view of a pipe joint formed by a corrugated semi-flexible collar and two non-interengaging pipe sections.

Referring to the drawings, a flexible pipe joint is formed by securing non-interengaging pipe sections 2 and 3 at their ends thereof into coupling collar 10 as shown in FIG. 1. Coupling collar 10 is preferably made of a semi-rigid and semi-flexible plastic material which is also resistant to deterioration through the effects of water, ground acids and bases or sewage effluence. Because coupling collar 10 is the primary coupling for joining adjacent pipe sections, it must be at least semi-rigid. It must be sufficiently rigid that as a workman is installing the pipe, the pipe being installed, once inserted into the receiving end of coupling collar 10, will not simply flop from side to side or up and down. In other words, collar 10 must hold the pipe firmly in place while the pipe setting and back filling operation is being performed.

On the other hand, the plastic material must be one which is to some extent semi-flexible. It must be sufficiently flexible that once the pipe is in place, the coupling collar 10 will allow slight misalignment as a result of ground shifting or the like without breaking or rupturing coupling collar 10. Further, it must be sufficiently flexible that where purposeful misalignment is desired, it can be effected.

One example of a plastic material which is suitable for this collar is polypropylene.

Figure 2:
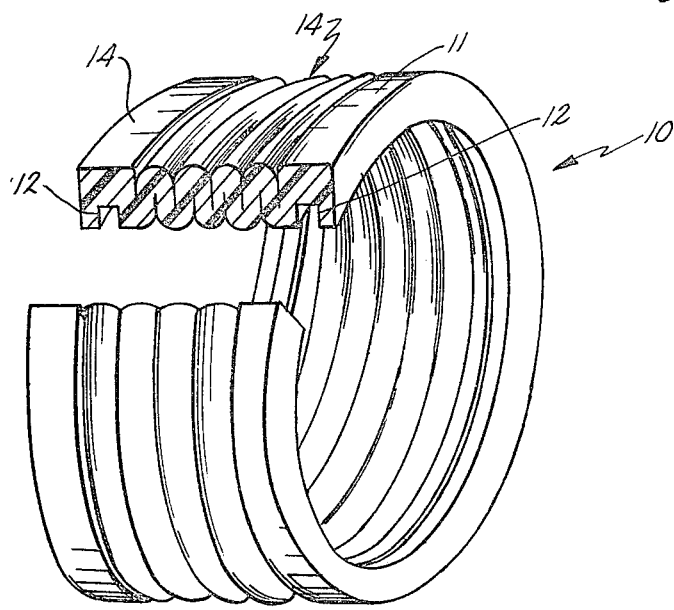
FIG. 2 is a perspective view of the corrugated collar of FIG. 1 with a portion thereof cut away.

Each end of coupling collar 10 comprises a pipe engaging annular shoulder 11 (FIGS. 1 and 2). Shoulder 11 is generally square in cross sectional configuration and is sufficiently large that it provides a firm pipe engaging surface. In other words, when seated on the end of a pipe 2 or 3, shoulder 11 must be sufficiently stiff and rigid that one cannot readily stretch it or pry it away from the surface of the end of pipe 2 or 3. Its width from left to right as viewed in FIG. 1 or FIG. 2 should be about 1 to 2 inches and its thickness from top to bottom should be about ½ to 1 inches.

An annular channel 12 is integrally molded into the inside face of each shoulder 11 for receiving an annular seal or O-ring 13. When each shoulder 11 is seated on the end of a pipe section 2 or 3, O-ring 13 provides a seal against leakage of water in or out of the pipe joint.

Between the shoulders 11, coupling collar 10 comprises a corrugated section 14. Preferably at least four corrugations are provided to give the overall coupling collar the desired flexiblilty. The wall thickness of the corrugated section 14 is preferably about ⅛ to ½ inches. Corrugated mid-section 14 allows accordion like movement of coupling collar 10 as is illustrated in FIG. 3.

As can be seen by reference to the relative dimensions for shoulders 11 and corrugated mid-section 14, the pipe gripping shoulders 11 of coupling collar 10 are enlarged relative to the thickness of the wall section of corrugated mid-section 14. This is to facilitate the pipe gripping function of the shoulders 11 on the one hand and the flexibility function of the mid-section 14 on the other hand.

Preferably, the ends of each pipe section 2 and 3 taper downwardly slightly towards the end of the pipe. The slope of the taper is between 3 and 8 degrees with respect to the horizontal, preferably about 6 or 7 degrees. This slight taper makes it easier to slip the end of the pipe into the end of coupling collar 10. The corrugated configuration of corrugated mid-section 14 of coupling collar 10 tends to exert a downward force as one stretches coupling collar 10 and thus tends to increase the tightening grip of coupling collar 10 on the ends of pipe sections 2 and 3 as forces attempt to pull the pipe sections apart. Thus, there is somewhat of a "Chinese fingertrap" action by coupling collar 10 on the ends of pipe sections 2 and 3 which insures a sure grip even though there is a slight taper on the ends of pipe sections 2 and 3.

Figure 3:
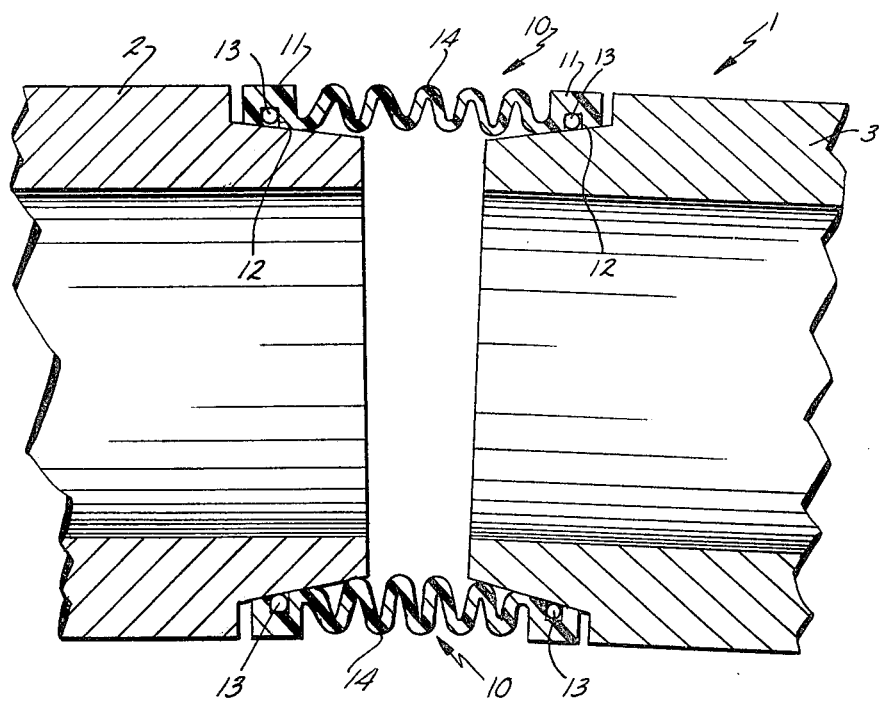
FIG. 3 is the pipe joint of FIG. 1 with the pipe sections misaligned and displaced.

In pipe joint 1 of FIGS. 1-3, pipe sections 2 and 3 form joint 1 by simple insertion of their ends into collar 10. Once inserted shoulders 11 and seals 13 therein engage the end portions of the pipe sections 2 and 3 and act to resist disengagement of pipe sections 2 and 3 from collar 10. When pipe sections 2 and 3 are displaced or misaligned, the corrugated mid-section 14 moves in an accordion-like manner so as to allow the displacement and misalignment of pipe sections 2 and 3 without disengagement of pipe sections 2 and 3 from collar 10.

Figure 5:
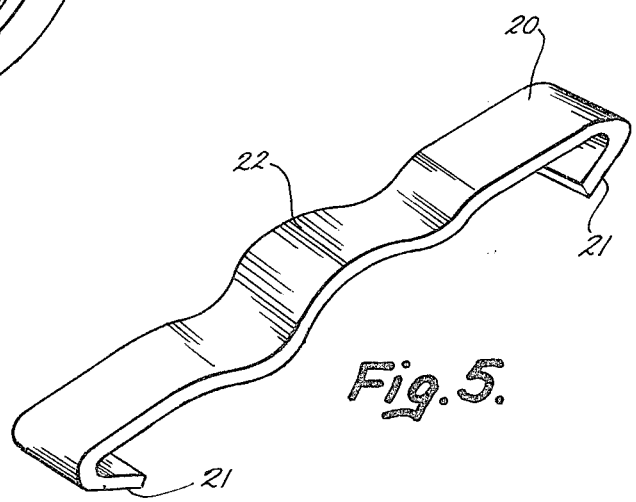
FIG. 5 is a perspective view of a spring clip.
Figure 4:
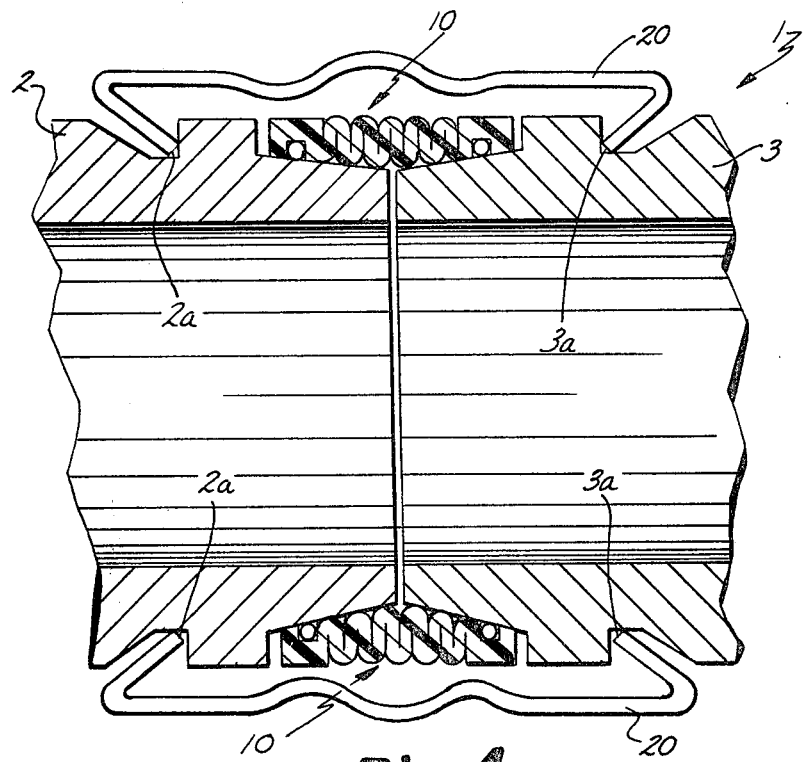
FIG. 4 is the pipe joint of FIG. 1 further including spring clips which connect notched portions of the pipe sections.

In the embodiment of joint 1 shown in FIG. 4, spring clips 20 connect notched portions 2a in pipe section 2 and adjacent corresponding notched portions 3a in pipe section 3. As best shown in FIG. 5, spring clip 20 comprises at both ends thereof downwardly curved portions or hooks 21. Spring clip 20 further comprises curved portion 22 at its mid-section which protrudes in a direction opposite to the curved direction of hooks 21.

When it is desired to engage spring clip 20 in the position shown in FIG. 4, one of the hooks 21 is anchored in a notched portion of one of the pipe sections, e.g. notch portion 2a. Spring clip 20 is then distended by downwardly pushing upon curved portion 22 so that the other curved portion 21 of spring clip 20 can be downwardly displaced into the corresponding adjacent notched portion of the other pipe section member e.g. notch section 3a. When so positioned pressure may be released from curved portion 22 on spring clip 20 so that spring clip 20 through its notched portion 21 acts to bias pipe sections 2 and 3 towards each other so as to at least bias them from separating from each other.

As is apparent from FIG. 4, it is desirable to mount spring clips 20 in pairs generally opposite to each other on pipe joint 1. As is also apparent from FIG. 4, it is recommended that the notched portions 2a and 3a in the respective pipe sections 2 and 3 be positioned on the pipe sections 2 and 3 at points spaced along the length thereof away from the tapered end portions of the pipe sections so that spring clip 20 extends over collar 10 and spans it completely. By so positioning, spring clips 20 may not be anchored into notches 2a and 3a until the end portions of pipe sections 2 and 3 are inserted into collar 10.

Another embodiment of pipe collar 110 and pipe joint 100 formed therewith are shown in FIGS. 6 and 7. Pipe collar 110, as seen in these figures, comprises a flexible narrow annular mid-section 114 which is biased inward toward the center of pipe sections 102 and 103 at its thinnest portion. In a manner similar to the embodiments described in the above FIGS. 1–5, collar 110 of FIGS. 6 and 7 comprises pipe engaging annular shoulder portions on sealing 111 on either side of flexible narrow mid-section 114. These sealing surfaces 111 similarly comprise therein channels 112 for housing annular "O" ring seals 13. The sealing shoulders 111 and seals 13 therein grip the ends of pipe sections 102 and 103 in a manner similar to that of shoulder 11 and seal 13 of the above-described collar embodiment of FIGS. 1–5.

As with collar 10 of the first preferred embodiment, the shoulders 111 of alternative embodiment collar 110 are enlarged with respect to the flexible mid-section 114 thereof. Mid-section 114 has a wall thickness of about $\frac{1}{4}$ to $\frac{3}{4}$ inches. Each shoulder 111 has a thickness of about $\frac{1}{2}$ to 1 inches and a width of about 1 to 2 inches. In this manner, shoulders 111 are sufficiently stiff and rigid that they cannot readily be pryed away from the surface of the ends of pipes 102 and 103 while mid-section 114 is sufficiently thin and flexible that it will allow some misalignment in pipes 102 and 103. The material of which collar 110 is made can be identical to that of which collar 10 of the first preferred embodiment is made.

The embodiment of collar 110 in FIGS. 6 and 7 further comprises cylindrical skirts 115 which are attached to shoulders 111 and taper outward therefrom. Skirts 115 are inwardly biased toward the center of pipe sections 102 and 103 so that after pipe sections 102 and 103 are joined into collar 110, skirts 115 act to securely engage the ends of pipe sections 102 and 103, even when the pipe ends are misaligned or displaced.

As is seen in FIGS. 6 and 7, the ends of pipe sections 102 and 103 have contoured surface portions 102b and 103b which are convex and which form a raised hump over which skirt 115 must extend. Each convex hump 102b and 103b has a low point near the end of the pipe and another low point spaced therefrom with a higher point in the middle. Skirt 115 must be sufficiently flexible and sufficiently thin in wall thickness that it can be stretched up and over this raised middle of the convex hump. Such convex surface end humps are particularly useful in forming pipe joint 100 with collar 110, since collar 110 has an inwardly biased mid-section 114 and inwardly biased skirts 115 which allow close conformance of these pipe end humps with the inner surface of collar 110.

As can be seen in FIG. 7, when pipe section 102 is displaced with respect to pipe section 103, inwardly biased skirt 115 acts to engage the end of pipe section 102, particularly at the uppermost point of the convex surface thereof, and resists complete disengagement of pipe section 102 from collar 110. Skirt 115 acts to engage the end of pipe section 102 in combination with the already engaging seal 13 thus providing a pipe joint 100 which is highly resistive of disengagement.

Also, as is apparent in FIG. 7, the convex shape of the pipe ends allows some rotation of the pipe end in collar 110 along the inner surface thereof because of the biased mid-section 114 and skirts 115, already discussed. This further facilitates slight shifting and misalignment of pipes 102 and 103 without breaking the seal between the pipe ends and collar 110.

As can be seen by the above description, which ever embodiment of pipe collar 110 which is utilized, the ends of pipe sections 102 and 103 could taper downwardly toward the center of the pipe to the pipe end, as shown in FIG. 1. Further, the pipe ends could also taper in a manner opposite to that shown in FIG. 1, to be rounded as in FIGS. 6 and 7, or be any one of a number of other embodiments.

It will be understood that various changes in the details, materials, steps, and arrangements of parts which have been herein described and illustrated in order to explain the nature of the invention, may be made by those skilled in the art within the principle and the scope of the invention as expressed in the appended claims.

The embodiments of the invention in which an exclusive property or privilege is claimed are defined as follows:

1. A flexible pipe joint comprising: first and second non-interengaging pipe sections and a cylindrical collar extending between and joining the ends of said pipe sections; said collar including an annular pipe engaging portion at each end thereof, each engaging an end of one of said pipe sections, and a mid-section between said pipe engaging portions which is relatively more flexible than said pipe engaging portions and which is sufficiently flexible to allow some misalignment of said pipe sections relative to one another, yet which is sufficiently rigid that said pipe sections do not readily shift relative to one another during installation of one pipe section into another and during the back filling operation; each annular pipe engaging portion of said collar including a shoulder which is enlarged with respect to the wall thickness of said flexible collar mid-section and rigid relative thereto; each enlarged shoulder including an annular channel on the inside, pipe-facing surface thereof, and a sealing means seated in said channel for sealing the juncture between said collar and the respective pipe end; each shoulder further including an annular, pipe-engaging skirt extending outwardly therefrom in a direction away from said collar mid-section; and each skirt being flexibly resilient, and biasing radially inwardly, without the aid of external force to frictionally abut against the outer surface of the respective pipe section end thereby retaining said pipe section ends within said collar.

2. The pipe joint of claim 1 in which each end portion of each of said pipes has an exterior surface which, in axial cross section, defines a generally convex hump, said surface extending from a smaller circumference at the extreme end of said pipe upwardly to a greater circumference at a point spaced from said extreme end of said pipe and then downwardly again to a lesser circumference at a point spaced still farther from said extreme end of said pipe; said skirt tapering downwardly from a greater circumference adjacent its respective shoulder to a lesser circumference at a point spaced from said shoulder whereby each of said skirts is stretched over the point of greatest circumference on said hump and engages said pipe end portions along a point of lesser circumference spaced farther from said extreme end of said pipe than said point of greatest circumference, thereby forming a secure connection which permits some rotation of either of said pipes with respect to said collar.

3. The pipe joint of claim 2 in which said collar is made of plastic.

4. The pipe joint of claim 3 in which said plastic of which said collar is made comprises polypropylene.

5. The pipe joint of claim 1 or 2 in which said mid-section of said collar comprises a generally continuous, non-corrugated wall extending between said shoulders.

* * * * *